United States Patent
Lee

(10) Patent No.: US 10,757,786 B2
(45) Date of Patent: Aug. 25, 2020

(54) APPARATUS FOR CONTROLLING IRRADIATED LIGHT ON FORKLIFT

(71) Applicant: DOOSAN CORPORATION, Seoul (KR)

(72) Inventor: Jin Yong Lee, Incheon (KR)

(73) Assignee: DOOSAN CORPORATION, Seoul (KR)

( * ) Notice: Subject to any disclaimer, the term of this patent is extended or adjusted under 35 U.S.C. 154(b) by 0 days.

(21) Appl. No.: 16/474,129

(22) PCT Filed: Dec. 28, 2017

(86) PCT No.: PCT/KR2017/015665
§ 371 (c)(1),
(2) Date: Jun. 27, 2019

(87) PCT Pub. No.: WO2018/124780
PCT Pub. Date: Jul. 5, 2018

(65) Prior Publication Data
US 2019/0387595 A1    Dec. 19, 2019

(30) Foreign Application Priority Data

Dec. 28, 2016  (KR) .................. 10-2016-0181107

(51) Int. Cl.
*H05B 47/10*    (2020.01)
*F21S 41/30*    (2018.01)
(Continued)

(52) U.S. Cl.
CPC .............. *H05B 47/10* (2020.01); *B60Q 1/06* (2013.01); *B66F 9/07504* (2013.01);
(Continued)

(58) Field of Classification Search
CPC ...... H05B 37/02; B60Q 1/06; B60Q 2200/30; B66F 9/07504; F21S 41/30
See application file for complete search history.

(56) References Cited

U.S. PATENT DOCUMENTS 4,224,657 A * 9/1980 Olson ................... B66F 9/0755
362/481
4,279,328 A * 7/1981 Ahlbom ................ B66F 9/0755
180/169
(Continued)

FOREIGN PATENT DOCUMENTS

DE   102006002960 A1    7/2007
DE   102013100200 A1 *  7/2014 ............... B60Q 1/50
(Continued)

OTHER PUBLICATIONS

Office Action issued in corresponding Korean Patent Application No. 10-2016-0181107 dated Mar. 12, 2019, consisting of 9 pp. (English Translation Provided).
(Continued)

*Primary Examiner* — Renan Luque
(74) *Attorney, Agent, or Firm* — Volpe and Koenig, P.C.

(57) ABSTRACT

An apparatus for controlling irradiated light of a forklift according to an embodiment of the present invention is characterized in including: a lamp driving unit for controlling an illumination angle of a lamp that illuminates a forklift; a fork position sensing unit provided at one side of the forklift or a carriage, and sensing a lifted position of a fork; and a control unit for controlling the illumination angle of the lamp through the lamp driving unit according to the lifted position of the forklift, when the lifted position is input from the fork position sensing unit.

4 Claims, 4 Drawing Sheets

(51) Int. Cl.
*B60Q 1/06* (2006.01)
*B66F 9/075* (2006.01)
*B66F 17/00* (2006.01)
*B60Q 1/26* (2006.01)

(52) U.S. Cl.
CPC ............ *B66F 17/003* (2013.01); *F21S 41/30* (2018.01); *B60Q 1/26* (2013.01); *B60Q 2200/30* (2013.01)

(56) References Cited

U.S. PATENT DOCUMENTS

| | | | | |
|---|---|---|---|---|
| 4,855,884 | A | * | 8/1989 | Richardson ............... F21V 7/16 362/278 |
| 6,208,260 | B1 | * | 3/2001 | West ....................... B66C 15/06 340/5.1 |
| 9,230,419 | B2 | * | 1/2016 | Beggs .................. B60Q 1/2673 |
| 2016/0200240 | A1 | * | 7/2016 | Quinlan ............. H05B 37/0227 315/80 |
| 2017/0120800 | A1 | * | 5/2017 | Linan ...................... B60Q 1/08 |
| 2017/0275145 | A1 | * | 9/2017 | Laker ................... B66F 17/003 |

FOREIGN PATENT DOCUMENTS

| | | | |
|---|---|---|---|
| JP | S6346244 | U | 3/1988 |
| JP | 2003-306299 | A | 10/2003 |
| KR | 10-1998-0045681 | A | 9/1998 |
| KR | 10-1999-0084967 | A | 12/1999 |
| KR | 10-2002-0051220 | A | 6/2002 |
| KR | 10-2007-0068519 | A | 7/2007 |
| KR | 20070068519 | A * | 7/2007 |
| WO | 2016-112387 | A1 | 7/2016 |

OTHER PUBLICATIONS

International Search Report issued in corresponding International Patent Application No. PCT/KR2017/015665 dated Apr. 16, 2018, consisting of 5 pp. (English Translation Provided).

Written Opinion issued in corresponding International Patent Application No. PCT/KR2017/015665 dated Apr. 16, 2018, consisting of 6 pp.

Extended Search Report issued in corresponding European Patent Application No. 17885827.0 dated Dec. 5, 2019, consisting of 6 pp.

* cited by examiner

PRIOR ART

APPARATUS FOR CONTROLLING IRRADIATED LIGHT ON FORKLIFT

FIELD OF INVENTION

Embodiments of the present invention relate to an apparatus for controlling irradiated light of forklifts.

BACKGROUND

Forklifts are industrial vehicles used for lifting and transporting heavy cargoes, and are widely used in various industrial and construction sites.

Such a forklift, as illustrated in FIG. 1, includes a vehicle body 1, and a mast assembly 4 is provided at the front of the vehicle body 1.

Such a mast assembly 4 includes a mast rail 5 and a carriage 6 which may move upward and downward along the mast rail 5. A pair of forks 6a for lifting a cargo A upward are mounted at the carriage 6 so as to be adjustable in spacing.

In an embodiment, a driving cab 7 is formed on the vehicle body 1, and an overhead guard 8 is provided at an upper side of the driving cab 7. The overhead guard 8 serves to protect a driver on board the driving cab 7. Headlights 9 are provided on opposite sides of a front surface of the overhead guard 8. The headlights 9 illuminate the cargo A of the carriage 6 during the night work to simplify unloading and transportation of the cargo.

However, since such a conventional headlight 9 is fixedly secured to face forwardly, there is a problem in that the lifted cargo A may not be illuminated when the carriage 6 is raised to lift the cargo A to a high position.

Accordingly, there is a problem in that, when the cargo is loaded at a high place or the cargo located at a high place is relocated, it is difficult to unload and transport the cargo.

Especially during the night work, the cargo may fall and damage the products and cause safety accidents.

In large-scale logistics warehouses and refrigerated warehouses, there are many cases in which the cargo is loaded to a very high position. In such a case, the risk of safety accidents becomes higher.

PRIOR ART LITERATURE

Patent Document 1: KR 10-2007-0068519 A

SUMMARY

Technical Problem

The present invention addresses the above problems of the prior art, and is directed to providing an apparatus for controlling irradiated light of forklifts capable of substantially preventing safety accidents that may occur during operation, by brightly illuminating a cargo through the control of an illumination angle of an irradiated light onto a cargo according to fork elevation of the forklift.

The present invention is also directed to substantially preventing safety accidents that may occur when loading or relocating a cargo, at a high position, indoors, e.g., in a warehouse or a refrigerator, or at night.

The present invention is also directed to providing an apparatus for controlling a lamp of a carriage of a forklift which is simple in structure and low in installation cost.

Solution to Problem

An apparatus for controlling irradiated light of a forklift according to an embodiment of the present invention is characterized in including: a lamp driving unit for controlling an illumination angle of a lamp that illuminates a forklift; a fork position sensing unit provided at one side of the forklift or a carriage, and sensing a lifted position of a fork; and a control unit for controlling the illumination angle of the lamp through the lamp driving unit according to the lifted position of the forklift, when the lifted position is input from the fork position sensing unit.

The apparatus for controlling irradiated light of a forklift is characterized in further including: a reflector provided behind the lamp and adjusting a brightness and an illumination distance of lighting by using reflection of a lamp light; and a reflector driving unit provided behind the lamp and enabling control of a width of the reflector.

Effects of the Invention

An apparatus for controlling irradiated light of forklifts according to an embodiment of the present invention may allow irradiated light to be directed onto a cargo precisely by adaptively controlling an illumination angle of a lamp according to a lifted height of a fork or a carriage.

In addition, in an apparatus for controlling irradiated light of forklifts according to an embodiment of the present invention, even if the fork or the carriage moves to a remote place, an illumination distance increases further by adaptively controlling a width of a reflected light according to a lifted height of the fork or the carriage and a distance thereof to the lamp, such that the irradiated light may be directed onto a cargo precisely.

DETAILED DESCRIPTION OF EMBODIMENTS

Figure 1:
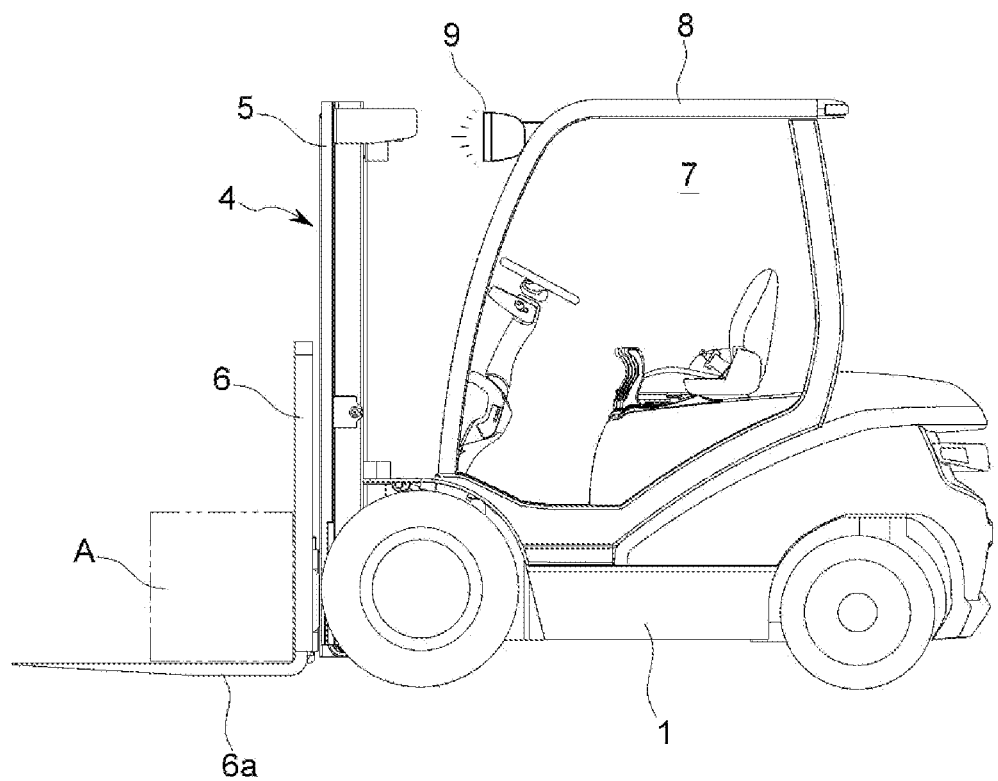
FIG. 1 is a side view schematically illustrating a conventional forklift according to the prior art.

The technical terms used herein are used only to describe specific embodiments and are not intended to limit the invention. It is also to be understood that the technical terms used herein are to be interpreted in a sense generally understood by a person skilled in the art to which the present invention belongs, unless stated otherwise, should not be construed in an excessively comprehensive manner, or should not be interpreted in an excessively reduced sense. Further, when a technical term used herein is an erroneous technical term that does not accurately express the spirit of the present invention, it should be understood as a technical term that can be understood by a person skilled in the art. In addition, the general terms used in the present invention should be interpreted as defined in the dictionary or according to the context, and should not be construed in an excessively reduced sense.

In addition, the singular forms used herein include plural referents, unless the context clearly dictates otherwise. In the present application, the term "comprising" or "including" or the like should not be construed as necessarily including all the various elements or steps described in the specification. That is, some of the elements or some of the steps may not be included, or may be interpreted to include additional elements or steps.

Further, the suffix "module" and "unit" for elements used in the present specification are given or mixed in consideration of ease of description, and do not have their own meaning or role.

It will be understood that, although the terms "first," "second," "third," and the like may be used herein to describe various elements, these elements should not be limited by these terms. These terms are only used to distinguish one element from another element. Thus, "a first element" discussed below could be termed "a second element" or "a third element," and "a second element" and "a third element" may be termed likewise without departing from the teachings herein.

Hereinafter, embodiments of the present invention will be described in detail with reference to the accompanying drawings, where like reference numerals refer to like or similar elements, and redundant description thereof will be omitted.

In the following description, well-known functions or constructions are not described in detail since they would obscure the invention in unnecessary detail. It is to be noted that the accompanying drawings are only for the purpose of facilitating understanding of the present invention, and should not be construed as limiting the scope of the present invention with reference to the accompanying drawings.

Figure 2:
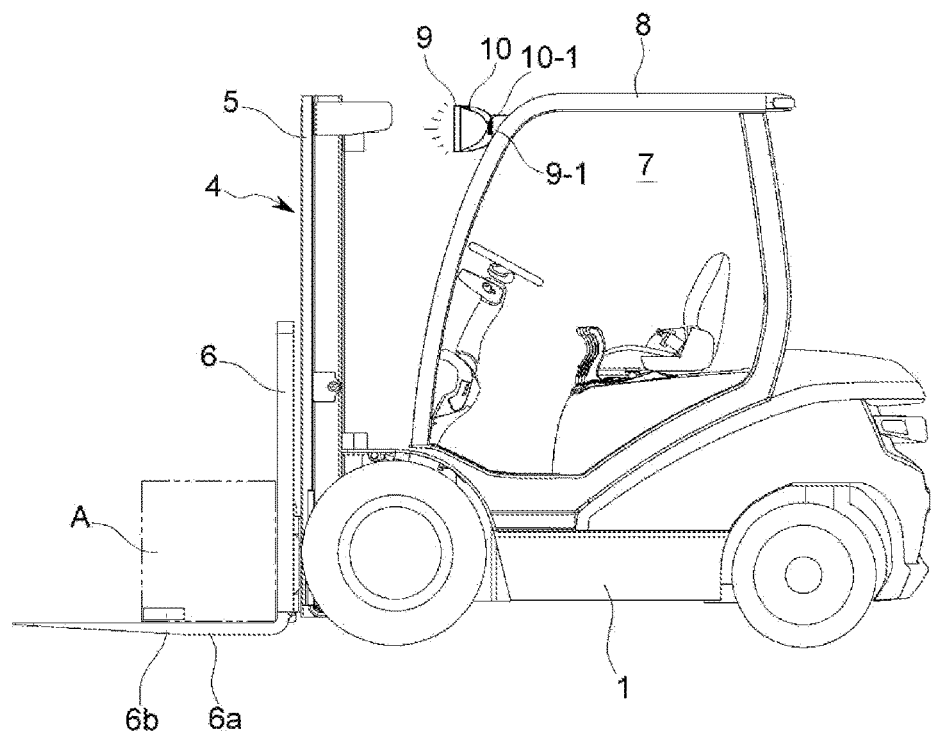
FIG. 2 is a side view schematically illustrating a forklift according to an embodiment of the present invention.

FIG. 2 is a side view schematically illustrating a forklift according to an embodiment of the present invention.

The same reference numerals are assigned to the same elements as those in the conventional art, and a description thereof will be omitted.

As illustrated in FIG. 2, a forklift according to an embodiment of the present invention includes a mast assembly 4 including a mast rail 5 and a carriage 6 provided at a front surface of the forklift, a pair of forks 6a installed at the carriage 6 to lift a cargo, a load sensing unit 6b, an overhead guard 8 installed at an upper side of a driving cap 7, lamps 9 installed on opposite sides of a front surface of the overhead guard 8, a lamp driving unit 9-1 for controlling an illumination angle of the lamps 9, a reflector 10, and a reflector driving unit 10-1 for controlling a width of the reflector 10.

The forklift according to an embodiment of the present invention senses a lifted height of the forklift 6a or the carriage 6 and adaptively controls an illumination angle of the lamp 9 according to the lifted height of the forklift 6a or the carriage 6, thus allowing the irradiated light to be directed onto a cargo precisely. In addition, a width of a reflected light is adaptively controlled according to the lifted height of the forklift 6a or the carriage 6 and a distance thereof from the lamp 9 so that an illumination distance increases further, even if the forklift 6a or the carriage 6 moves to a remote place, thus allowing the irradiated light to be directed onto a cargo precisely.

Figure 3:
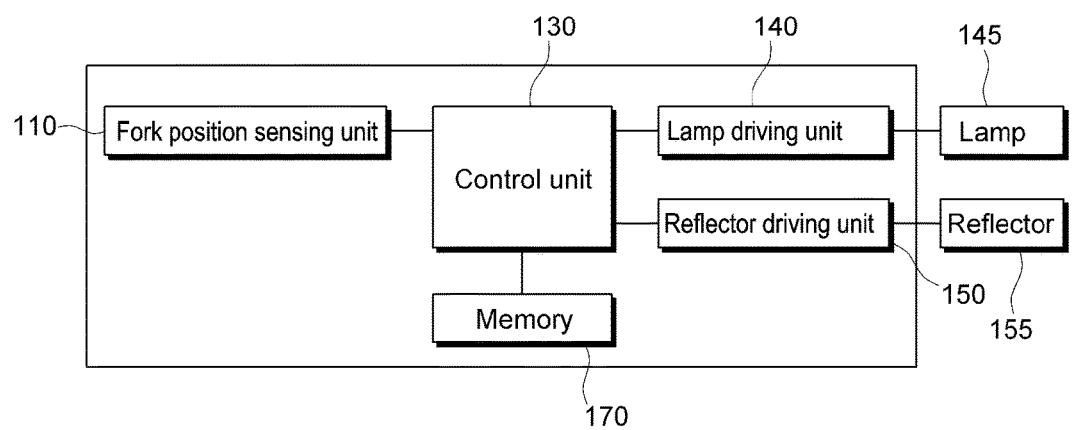
FIG. 3 is a block diagram schematically illustrating a configuration of an apparatus for controlling irradiated light of forklifts according to an embodiment of the present invention.

FIG. 3 is a block diagram schematically illustrating a configuration of an apparatus for controlling irradiated light of forklifts according to an embodiment of the present invention.

Figure 4:
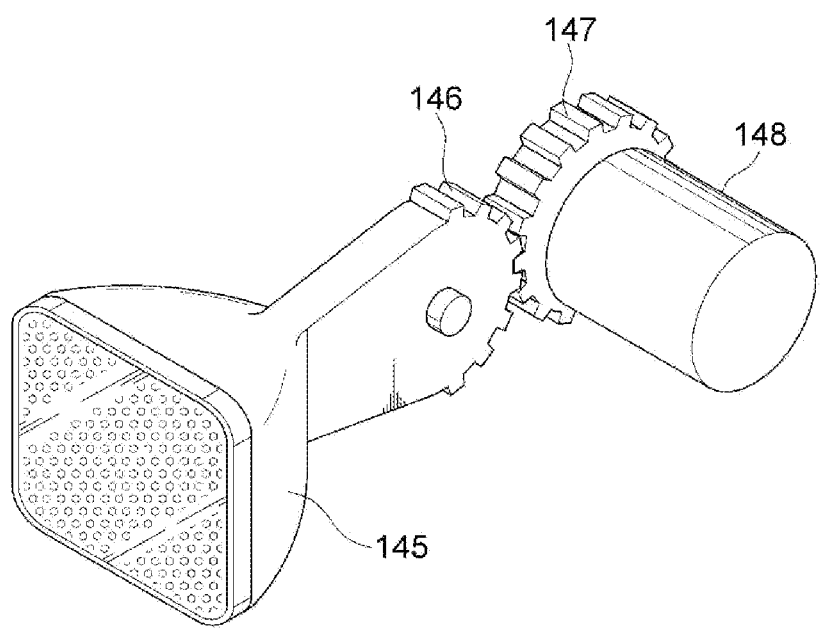
FIG. 4 is a view illustrating an embodiment of a lamp 145 and a lamp driving unit 150 according to an embodiment of the present invention.
Figure 5:
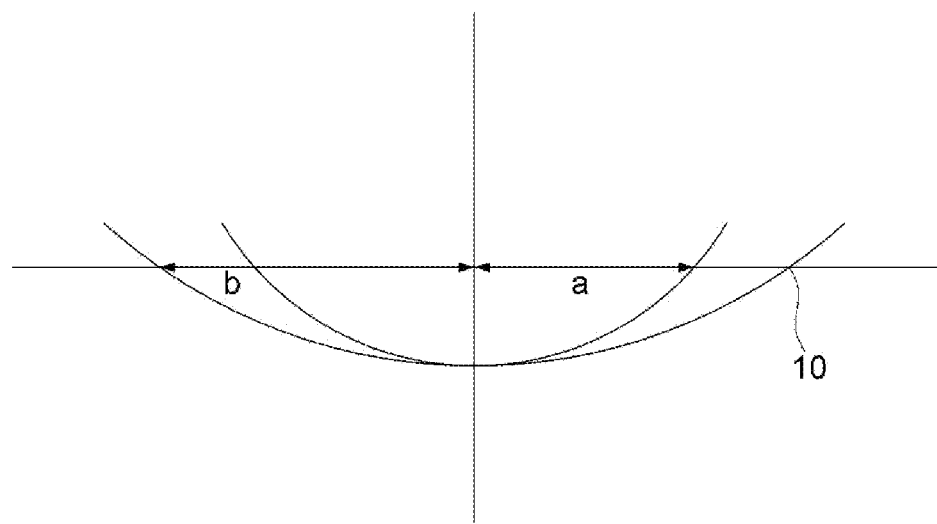
FIG. 5 is a view for explaining the control of a width of a reflector according to an embodiment of the present invention.

FIG. 4 is a view illustrating an embodiment of a lamp 145 and a lamp driving unit 150 according to an embodiment of the present invention, and FIG. 5 is a view for explaining the control of a width of a reflector according to an embodiment of the present invention.

First, referring to FIG. 3, an apparatus for controlling irradiated light of forklifts may include a fork position sensing unit 110, a control unit 130, a lamp driving unit 140, a lamp 145, a reflector driving unit 150, a reflector 155, and a memory 170.

The fork position sensing unit 110 is an element provided at one side of the fork 6a or the carriage 6 for sensing a lifted position of the fork. The fork position sensing unit 110 may sense a height of the forklift 6a or the carriage 6 from the ground. For example, the fork position sensing unit 110 may be an altitude sensor. The fork position sensing unit 110 transmits the sensed value to the control unit 130.

The lamp driving unit 140 is an element provided at a front side of the overhead guard 8 so as to control an illumination angle of the lamp 145.

The lamp driving unit 140 may include a gear wheel-shaped structure 147 and a step motor 40.

The gear wheel-shaped structure 147 is formed to engage with a gear wheel-shaped structure 146 provided at the lamp 145, and rotates the lamp 145 upward and downward by driving the step motor 40.

In particular, the lamp 145 is rotated upward or downward according to a control signal from the control unit 130 to illuminate the cargo A of the carriage 6 precisely. The lamp driving unit 140 may further include a lamp angle sensor (not illustrated) for adjusting the illumination angle of the lamp.

The reflector 155 is provided behind a light source inside the lamp 145 to adjust a brightness of lighting using reflection of the lamp light.

The reflector driving unit 150 controls a width of the reflector 155 to control an illumination distance of the lamp. The reflector driving unit 150 may control the width of the reflector by pushing or pulling opposite ends of the reflector 155 according to an instruction from the control unit 130. As the width of the reflector becomes narrower, the illumination distance of the light may be further increased.

As illustrated in FIG. 5, when a load is applied to opposite ends of the reflector, a width a of the reflector decreases, and when the width of the reflector decreases, the illumination distance of the light becomes greater than a width b of the reflector when the load is not applied to the opposite ends.

The control unit 130 controls other elements to control the irradiated light of the apparatus for controlling irradiated light. When the lifted position of the forklift 6a is input from the fork position sensing unit 110, the control unit 130 controls the illumination angle of the lamp and the width of the reflector according to the lifted position of the forklift 6a.

For example, the control unit 130 narrows the width of the reflector, as the distance between the forklift 6a and the lamp increases.

In another modified embodiment, the control unit 130 may control to narrow the width of the reflector, when a height of the forklift 6a exceeds a certain reference point.

The memory 170 stores the illumination angle and the width of the reflector corresponding to the lifted position of the forklift 6a.

In the apparatus for controlling the headlamp according to an embodiment having such a configuration, after the lifted position of the carriage 6 is sensed, the illumination angle of the lamp and the width of the reflector are controlled according to the sensed position. Accordingly, even if the lifted position of the fork is changed, or even if the fork loads the cargo at a highest height, the lamp may invariably illuminate the cargo A, supported by the fork, clearly and brightly. Accordingly, it is possible to allow the worker to unload and transport the cargo conveniently and safely.

Figure 6:
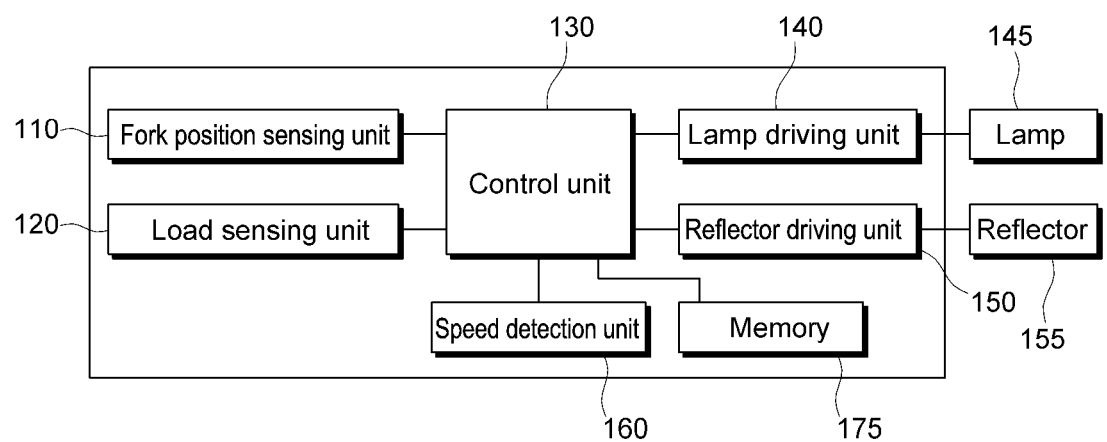
FIG. 6 is a block diagram schematically illustrating a configuration of an apparatus for controlling irradiated light of forklifts according to another embodiment of the present invention.

FIG. 6 is a block diagram schematically illustrating a configuration of an apparatus for controlling lighting of forklifts according to another embodiment of the present invention.

An apparatus for controlling irradiated light of forklifts may include a fork position sensing unit 110, a load sensing unit 120, a control unit 135, a lamp driving unit 140, a reflector 155, a reflector driving unit 150, a speed detection unit 160, and a memory 170.

The fork position sensing unit 110 is provided at one side of a fork (6a in FIG. 2) or one side of a carriage (6 in FIG. 2) to sense a lifted position of the fork (6a in FIG. 2). The fork position sensing unit 110 may be an altitude sensor.

The fork position sensing unit 110 is an element provided at one side of the forklift 6a or the carriage 6 for sensing a lifted position of the fork. The fork position sensing unit 110 may sense a height of the forklift 6a or the carriage 6 from the ground. For example, the fork position sensing unit 110 may be an altitude sensor. The fork position sensing unit 110 transmits the sensed value to the control unit 130.

The load sensing unit 120 is an element provided at a lower end of the forklift 6a for detecting a load of the forklift 6a. For example, the load sensing unit 120 may be a pressure sensor. The load sensing unit 120 transmits the detected load value to the control unit 130.

The lamp driving unit 140 is an element for controlling an illumination angle of the lamp 145. The reflector 155 is provided behind a light source inside the lamp 145 to adjust a brightness of the lighting using reflection of the lamp light. The reflector 155 may be provided outside or inside the lamp 145.

The reflector driving unit 150 controls a width of the reflector 155 to control an illumination distance of the lamp 145. The reflector driving unit 150 may control an angle of the reflector 155 by pushing or pulling opposite ends of the reflector 155 according to an instruction from the control unit 130. As the angle of the reflector 155 becomes narrower, the illumination distance of the light may be further increased.

The speed detection unit 160 is an element for detecting a travel speed of the forklift. The configuration for detecting a travel speed of a vehicle is a technique known to those skilled in the art, and thus a detailed description thereof will be omitted.

The control unit 135 may switch a mode of the lamp and the reflector between an operation mode and a traveling mode according to the state of the forklift. The operation mode is a mode in which the control unit 135 automatically controls an angle of the lamp and a width of the reflector according to the lifted position of the forklift 6a, and the traveling mode means a normal traveling mode. In case of the traveling mode, the angle of the lamp and the reflector may be fixed to a predetermined value.

The control unit 135 may determine that it is the traveling mode, when the travel speed of the forklift, which is input from the speed detection unit 160, is a previously stored reference value or higher.

The control unit 135 may determine that it is the operation mode, when the travel speed of the forklift, which is input from the speed detection unit 160, is lower than the previously stored reference value, and a load value input from the load sensing unit 120 is not zero.

The forklift according to the present invention having such a configuration senses a lifted position of the carriage 6 and controls the illumination angle of the lamp and the width of the reflector according to the sensed position. Accordingly, even if the lifted position of the fork lift is changed, or even if the fork lift loads the cargo at a highest height, the lamp may invariably illuminate the cargo A, supported by the fork, clearly and brightly. Accordingly, it is possible to allow the worker to unload and transport the cargo conveniently and safely.

The embodiments disclosed herein have been described with reference to the accompanying drawings. Thus, the embodiments shown in the drawings are not to be construed as limiting, and those skilled in the art will understand that embodiments of the present invention can be combined with each other, and when combined, some of the components may be omitted.

Terms and words used in the present specification and claims should not be construed as limited to ordinary or dictionary meanings, but should be construed as meaning and concept consistent with the technical idea disclosed in the present specification.

Therefore, the embodiments described in the present specification and the configurations shown in the drawings are only examples described in this specification, and it is not that all of the technical ideas disclosed in this specification are described. Therefore, it is to be understood that equivalents and modifications are possible at the time of filing this application.

According to an embodiment of the present invention, a width of a reflected light may be adaptively controlled according to a lifted height of a fork or a carriage and a distance thereof to a lamp, thereby improving the convenience of the operator.

The invention claimed is:

1. An apparatus for controlling irradiated light of a forklift, the apparatus comprising:
   a lamp driving unit for controlling an illumination angle of a lamp that illuminates the forklift;
   a fork position sensing unit provided at one side of the forklift or a carriage, and sensing a lifted position of the forklift;
   a control unit for controlling the illumination angle of the lamp through the lamp driving unit according to the lifted position of the forklift input from the fork position sensing unit; and
   a speed detection unit for detecting a travel speed of the forklift,
   wherein the control unit is characterized in determining that it is a traveling mode when the travel speed becomes a predetermined speed or higher, and
   wherein the control unit is characterized in fixing the illumination angle of the lamp to a predetermined traveling angle, when the control unit determines that the forklift is in the traveling mode.

2. The apparatus of claim 1, further comprising:
   a reflector provided behind the lamp and adjusting a brightness and an illumination distance of lighting by using reflection of a lamp light; and
   a reflector driving unit provided behind the lamp and enabling control of a width of the reflector.

3. The apparatus of claim 2, wherein the control unit is characterized in controlling the width of the reflector according to the lifted position of the forklift, which is input thereto, by using the reflector driving unit.

4. The apparatus of claim 1, further comprising a load sensing unit provided at the forklift and sensing a load of the forklift,
- wherein the control unit is characterized in determining that it is an operation mode, when the travel speed is lower than the predetermined speed and that the load is detected by the load sensing unit, so as to control the irradiated light according to the lifted position of the forklift.

* * * * *